(12) United States Patent
Kim

(10) Patent No.: US 12,364,365 B2
(45) Date of Patent: Jul. 22, 2025

(54) FOOD PROCESSOR

(71) Applicant: NUC ELECTRONICS CO., LTD., Daegu (KR)

(72) Inventor: Jong Boo Kim, Daegu (KR)

(73) Assignee: NUC ELECTRONICS CO., LTD., Daegu (KR)

( * ) Notice: Subject to any disclaimer, the term of this patent is extended or adjusted under 35 U.S.C. 154(b) by 0 days.

(21) Appl. No.: 18/987,595

(22) Filed: Dec. 19, 2024

(65) Prior Publication Data

US 2025/0204726 A1    Jun. 26, 2025

(30) Foreign Application Priority Data

Dec. 22, 2023    (KR) .................... 10-2023-0190171

(51) Int. Cl.
| | |
|---|---|
| *A47J 43/046* | (2006.01) |
| *A47J 27/00* | (2006.01) |
| *A47J 36/06* | (2006.01) |
| *A47J 43/07* | (2006.01) |

(52) U.S. Cl.
CPC .......... *A47J 43/046* (2013.01); *A47J 27/004* (2013.01); *A47J 36/06* (2013.01); *A47J 43/0727* (2013.01); *A47J 43/0761* (2013.01)

(58) Field of Classification Search
None
See application file for complete search history.

(56) References Cited

FOREIGN PATENT DOCUMENTS

| | | | | |
|---|---|---|---|---|
| CN | 109589014 A | * | 4/2019 | .......... A47J 43/0716 |
| EP | 2 612 580 B1 | | 4/2017 | |
| JP | 2018-504940 A | | 2/2018 | |
| KR | 10-2257104 B1 | | 5/2021 | |
| KR | 10-2351746 B1 | | 1/2022 | |
| KR | 10-2588018 B1 | | 10/2023 | |

* cited by examiner

*Primary Examiner* — John J Norton

(57) ABSTRACT

Disclosed is a food processor including: a container including an accommodation tank with an upward opening; a lid coupled to the accommodation tank to cover an upper side of the accommodation tank, and having a first steam discharge hole formed in a central portion of the lid; a lid cap coupled to the lid to cover the first steam discharge hole; a base in which the container is placed; and a heating unit provided in the base to surround a lower part of the accommodation tank and heat food ingredients in the accommodation tank. The lid cap includes: a stem passing through the first steam discharge hole; a stem protrusion formed on both sides of the stem and secured to the lid; and an oval-shaped steam blocking portion covering an upper side of the stem and extending laterally to cover the upper side of the first steam discharge hole.

5 Claims, 15 Drawing Sheets

FOOD PROCESSOR

CROSS-REFERENCE TO RELATED APPLICATION(S)

This application claims priority to Korean Patent Application No. 10-2023-0190171 filed in the Korean Intellectual Property Office on Dec. 22, 2023, the disclosure of which is incorporated by reference herein in its entirety.

TECHNICAL FIELD

The present disclosure relates to a food processor, and more particularly, to a food processor that performs processing, such as grinding and cooking, on food.

BACKGROUND

There are a variety of food processors that perform tasks such as grinding, mixing, and squeezing food ingredients.

The food processors include devices like mixers and blenders, which cook food by grinding or stirring, and multi-cookers, which cook food by heating during processes such as grinding and stirring.

Thus, the food processors designed for heating and cooking must have a mechanism to discharge steam, ensuring the pressure in a container remains within safe limits during heating.

However, the steam discharged during heating and cooking may reduce the food's moisture, resulting in poor cooking results.

PRIOR LITERATURE

Patent Document

Patent Document 1: European Patent Publication EP2612580B1

SUMMARY

The present disclosure provides a food processor that prevents excessive evaporation of moisture during heating and processing food.

The present disclosure also provides a food processor with improved insulation performance and vibration/noise reduction effect due to a cover surrounding a container.

The present disclosure also provides a food processor with increased convenience of opening and closing a cover surrounding a container.

It should be noted that objects of the present disclosure are not limited to the above-described objects, and other objects of the present disclosure will be apparent to those skilled in the art from the following descriptions.

In one aspect, there is provided a food processor including: a container including an accommodation tank with an upward opening; a lid coupled to the accommodation tank to cover an upper side of the accommodation tank, and having a first steam discharge hole formed in a central portion of the lid; a lid cap coupled to the lid to cover the first steam discharge hole; a base in which the container is placed; and a heating unit provided in the base to surround a lower part of the accommodation tank and heat food ingredients in the accommodation tank. The lid cap includes: a stem passing through the first steam discharge hole; a stem protrusion formed on both sides of the stem and secured to the lid; and an oval-shaped steam blocking portion covering an upper side of the stem and extending laterally to cover the upper side of the first steam discharge hole.

Other specific details of the present disclosure are included in the detailed description and drawings.

According to embodiments of the present disclosure, at least the following effects are achieved.

It is possible to prevent excessive evaporation of moisture during heating and processing of food.

Alternatively, it is possible to improve the vibration/noise reduction effect and the insulation performance due to a cover surrounding a container.

Alternatively, it is possible to improve the convenience of opening and closing a cover surrounding a container.

Advantageous effects which can be obtained through the embodiments of the present disclosure are not limited to the advantageous effects listed above, and here may be a variety of technical effects that a person having ordinary skill in the related art can understand and/or derive from the present disclosure.

DETAILED DESCRIPTION

Figure 1:
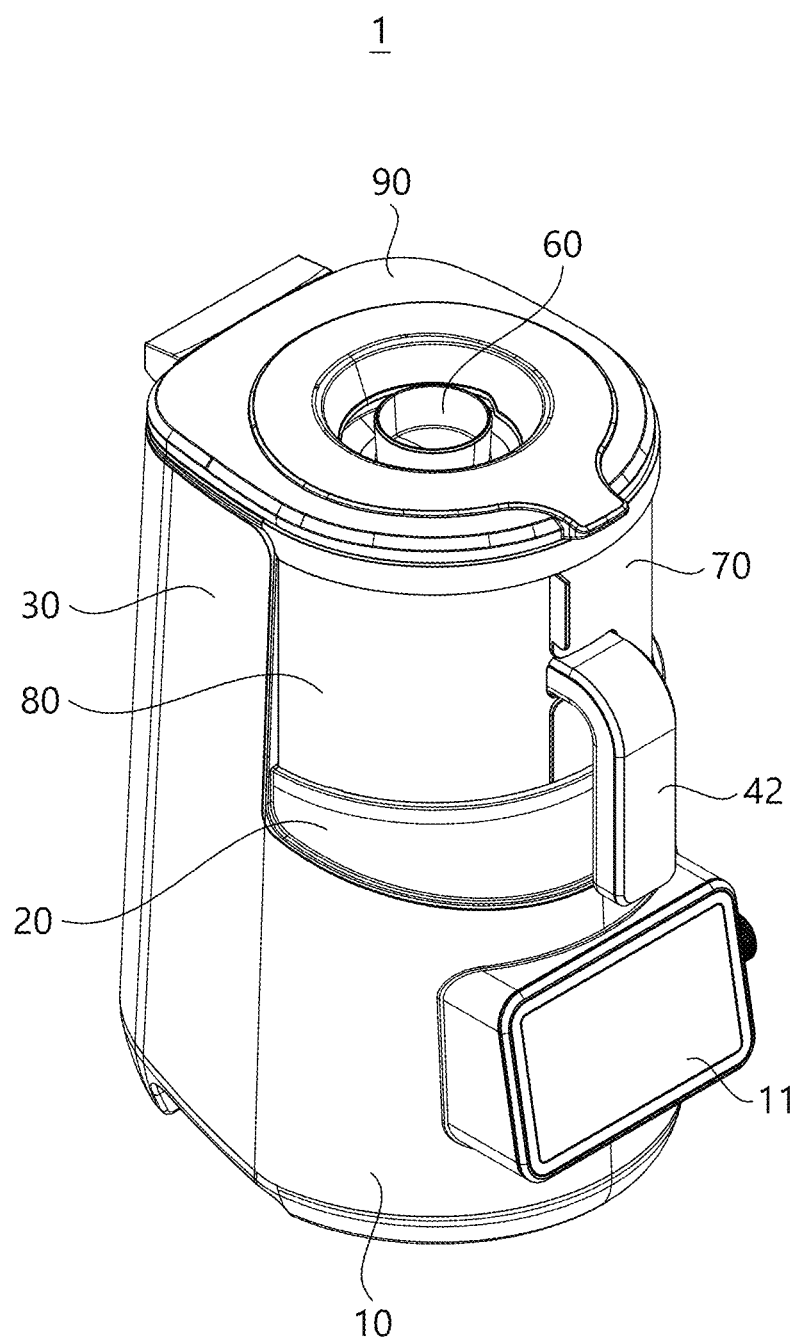
FIG. 1 is a perspective view illustrating a closed state of a food processor according to one embodiment of the present disclosure.

Advantages and features of the present disclosure and a method of achieving the same should become clear with embodiments described in detail below with reference to the accompanying drawings. However, the present disclosure is not limited to the embodiments disclosed below and may be realized in various other forms. The present embodiments make the disclosure complete and are provided to completely inform one of ordinary skill in the art to which the present disclosure pertains of the scope of the disclosure. The present disclosure is defined only by the scope of the claims.

Exemplary embodiments of the disclosure are described herein with reference to plan and cross-section illustrations that are schematic illustrations of idealized exemplary embodiments of the disclosure. Therefore, the form of the example may be modified due to manufacturing technology and/or tolerance, etc. In the drawings, respective elements may be enlarged or reduced in size for convenience of explanation. Like reference numerals refer to like elements throughout the specification.

Hereinafter, the present disclosure will be described with reference to drawings for explaining a food processor according to an embodiment of the present disclosure.

Figure 2:
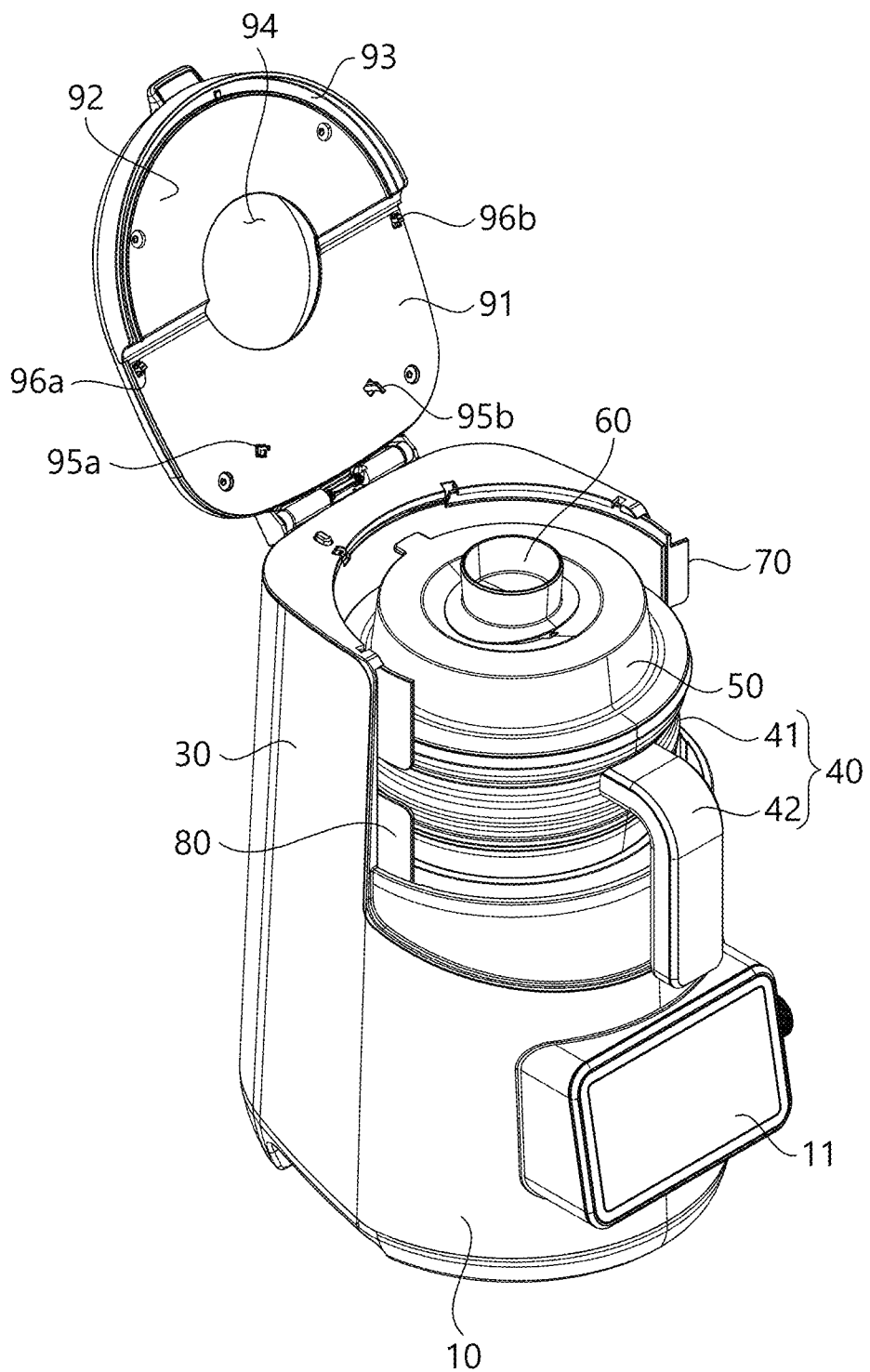
FIG. 2 is a perspective view illustrating an open state of a food processor according to one embodiment of the present disclosure.

FIG. 1 is a perspective view illustrating a closed state of a food processor according to one embodiment of the present disclosure; FIG. 2 is a perspective view illustrating an open state of a food processor according to one embodiment of the present disclosure; and FIG. 3 is an exploded perspective view of a food processor according to one embodiment of the present disclosure.

Figure 3:
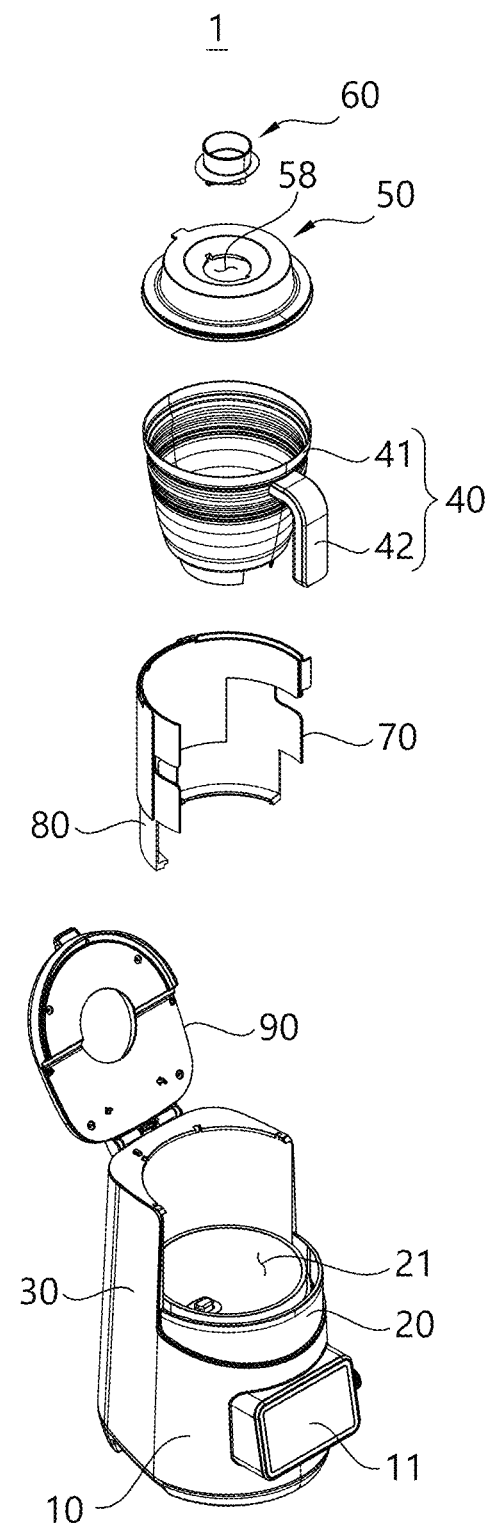
FIG. 3 is an exploded perspective view of a food processor according to one embodiment of the present disclosure.

Referring to FIGS. 1 to 3, a food processor 1 according to one embodiment of the present disclosure includes a base 10, a heating unit 20, a cover accommodation part 30, a container 40, a lid 50, a lid cap 60, a first side cover 70, a second side cover 80, and an upper cover 90.

The base 10 is configured such that the container 40 is detachably installed. The base 10 may include a power source (e.g., a motor) for driving a processing member (e.g., a blade, etc.) included in the container 40. The interior of the base 10 may be equipped with a circuit configuration for controlling the power source and heating unit 20, a heat dissipation configuration for dissipating heat generated from the power source and heating unit 20 to the outside, and the like.

Referring to FIG. 1 and the like, an operating unit 11 that receives inputs for controlling a power source and/or a heating unit 20, etc., may be provided on an outer surface of the base 10. Although the operating unit 11 is exemplified by a touch panel in FIG. 1, the operating unit 11 is not limited thereto and may include at least one operating means such as a dial, a button, and a touch panel. In addition, the operating unit 11 may include a display that enables searching and viewing of cooking recipes, and the display may enable viewing of the manual for the food processor 1 or display information such as a control status of the food processor 1 and guide for cooking using the food processor 1.

Referring to FIG. 3, the heating unit 20 is provided on top of the base 10 and forms a heating space 21 in which a lower part of the container 40 is accommodated. The heating unit 20 provides heat to an accommodation tank 41 accommodated within the heating space 21, thereby heating food ingredients accommodated inside the accommodation tank 41.

The heating unit 20 may include a heating coil surrounding the heating space 21. As another example, the heating unit 20 may include a coil capable of transferring heat through induction heating. As yet another example, the heating unit 20 may be configured to supply high temperature air to the heating space 21.

Referring to FIGS. 1 to 3, the cover accommodation part 30 is formed to extend upward from the base 10 so as to be positioned at a rear of the accommodation tank 41. The cover accommodation part 30 accommodates the first side cover 70 and the second side cover 80 to be retractable.

The first side cover 70 and the second side cover 80 are accommodated inside the cover accommodation part 30 in an open state (see FIG. 2). In the open state, the first side cover 70 may be only partially exposed to one side of the cover accommodation part 30, while mostly accommodated inside the cover accommodation part 30. In the open state, the second side cover 80 may be only partially exposed to the other side of the cover accommodation part 30, while mostly accommodated inside the cover accommodation part 30.

In a closed state (see FIG. 1), the first side cover 70 moves from one side of the cover accommodation part 30 along an upper edge of the base 10 toward a handle 42 of the container 40 to close one side of the accommodation tank 41 from the outside. That is, in the closed state (see FIG. 1), the first side cover 70 is arranged to extend from the cover accommodation part 30 so as to surround one side of the accommodation tank 41.

In the closed state (see FIG. 1), the second side cover 80 moves from the other side of the cover accommodation part 30 along the upper edge of the base 10 toward the handle 42 of the container 40 to close the other side of the accommodation tank 41 from the outside. That is, in the closed state (see FIG. 1), the second side cover 80 is arranged to extend from the cover accommodation part 30 so as to surround the other side of the accommodation tank 41.

Referring to FIG. 3, in the open state, the first side cover 70 and the second side cover 80 may be arranged to overlap each other inside the cover accommodation part 30. In order to prevent the first side cover 70 and the second side cover 80 from interfering with each other during the switching between the open state and the closed state, a path along which the first side cover 70 moves and a path along which the second side cover 80 moves may be separated from each other. For example, the movement path of the second side cover 80 may be formed inside the movement path of the first side cover 70. Conversely, the movement path of the second side cover 80 may be formed outside the movement path of the first side cover 70.

More details about the first side cover 70 and the second side cover 80 will be described later.

Referring to FIGS. 1 to 3, the upper cover 90 may be rotatably provided on top of the cover accommodation part 30. The upper cover 90 may be elastically supported with respect to the cover accommodation part 30 using an elastic member such as a spring provided on a rotational shaft, and the elastic member may provide an elastic force in a direction in which the upper cover 90 is opened.

A second steam discharge hole 94 may be formed to vertically pass through a central portion of the upper cover 90. The second steam discharge hole 94 is a space in which at least a portion of the lid cap 60 to be described is accommodated.

In the closed state (see FIG. 1), the upper cover 90 is in contact with an upper part of the cover accommodation part 30, an upper part of the first side cover 70, and an upper part of the second side cover 80. Therefore, in the closed state, the upper cover 90 closes an upper side of the accommodation space surrounded by the cover accommodation part 30, the first side cover 70, and the second side cover 80.

In the open state (see FIG. 2), the upper cover 90 opens the upper side of the accommodation space surrounded by the cover accommodation part 30, the first side cover 70, and the second side cover 80, thereby enabling the container 40 accommodated within the accommodation space to be removed.

Referring to FIG. 2, a lower surface of the upper cover 90 includes a first lower surface 91 in contact with an upper surface of the cover accommodation part 30, and a second lower surface 92 in contact with the first side cover 70 and second side cover 80.

Since the first side cover 70 and the second side cover 80 are respectively retractable from one side and the other side of the cover accommodation part 30, a step exists between the upper surface of the cover accommodation part 30 and each upper end of the first side cover 70 and second side cover 80.

In order to improve the sealing effect of the accommodation space, the first lower surface 91 and the second lower surface 92 may also have a step formed therebetween, which corresponds to the step between the upper surface of the cover accommodation part 30 and each upper end of the first side cover 70 and second side cover 80.

Through this structure, it is possible to prevent steam generated in the container 40 from being discharged between the upper cover 90 and any of the cover accommodation part 30, the first side cover 70, and the second side cover 80, thereby preventing a user from being accidentally burned by the steam.

Referring to FIG. 2, coupling hooks 96a and 96b for keeping the upper cover 90 and the cover accommodation part 30 coupled in the closed state may be exposed at the first lower surface 91. In addition, the first lower surface 91 may be provided with unlock protrusions 95a and 95b that are connected to the coupling hooks 96a and 96b to move the coupling hooks 96a and 96b to separation positions by opening of the first side cover 70 and the second side cover 80.

A flap receiving groove 93 may be formed in the second lower surface 92 to receive upper ends of the first side cover 70 and the second side cover 80. In order to prevent steam from leaking between the second lower surface 92 and any of the first side cover 70 and the second side cover 80, the flap receiving groove 93 may be formed of a sealing material having excellent sealing and adhesion properties.

The second steam discharge hole 94 may be formed to penetrate the first lower surface 91 and the second lower surface 92.

More details about the upper cover 90 will be described later.

Referring to FIG. 3, the container 40 may include the accommodation tank 41 with an upward opening and capable of containing food ingredients, and the handle 42 formed to protrude from the accommodation tank 41. Although not shown, the interior of the accommodation tank 41 may be provided with a processing member (e.g., a blade) for processing food ingredients. The processing member may be connected to a driving shaft exposed at an upper surface of the base 10 to receive rotational power.

The base 10 may be configured so that the container 40 is placed with the handle 42 positioned at the front.

Referring to FIGS. 2 and 3, the lid 50 seals an upper edge of the accommodation tank 41 and is detachably coupled to the accommodation tank 41. The lid cap 60 is detachably coupled to the lid 50 through a first steam discharge hole 58 formed in a central portion of the lid 50.

Specific details about the lid 50 and lid cap 60 will be described with reference to FIGS. 4 to 8.

Figure 4:
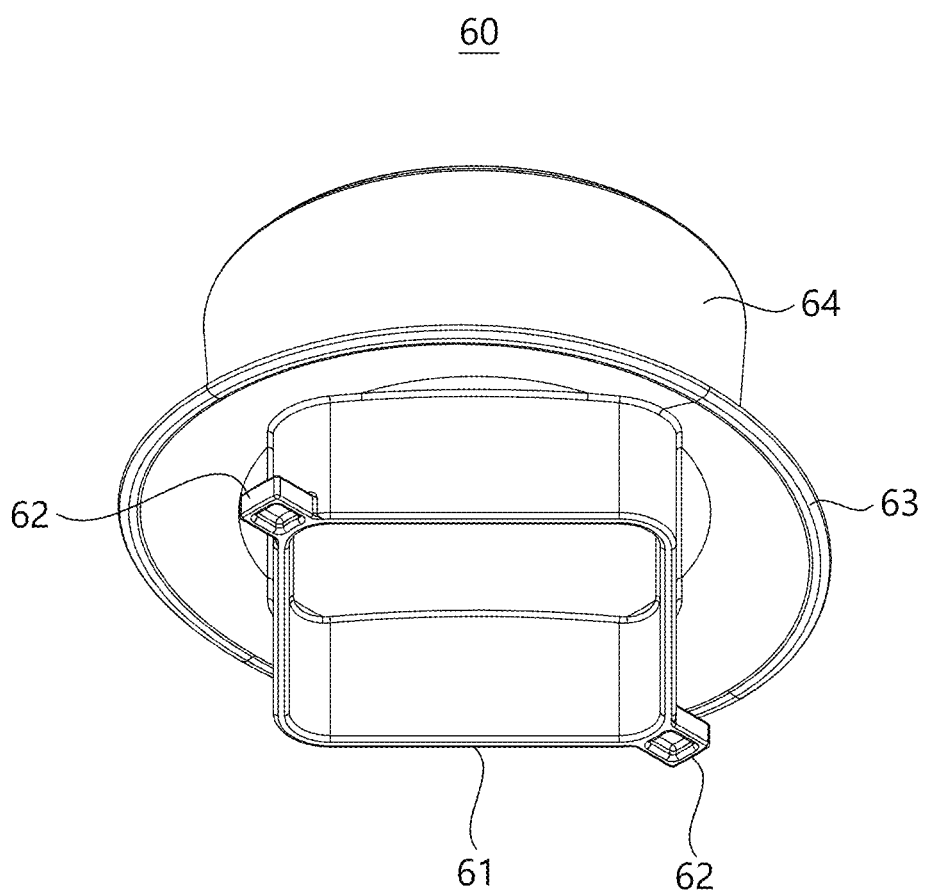
FIG. 4 is a perspective view illustrating a lid cap of a food processor according to one embodiment of the present disclosure.
Figure 5:
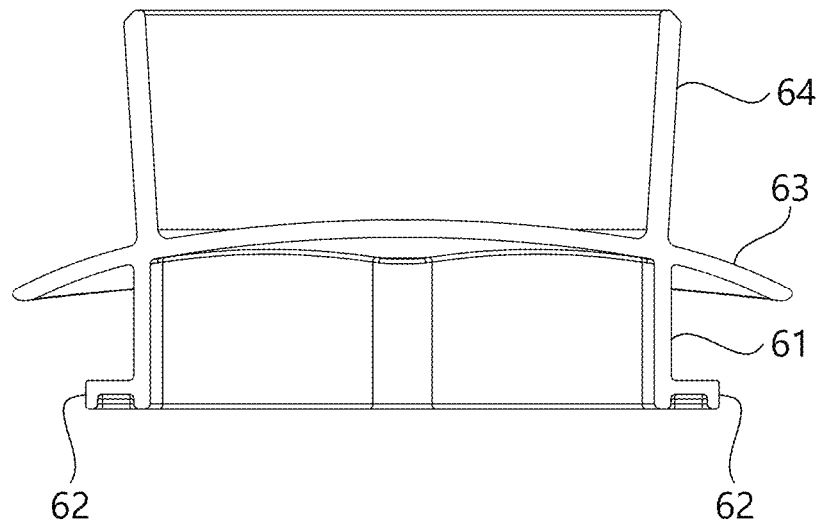
FIG. 5 is a cross-sectional view of a lid cap of a food processor according to one embodiment of the present disclosure.
Figure 6:
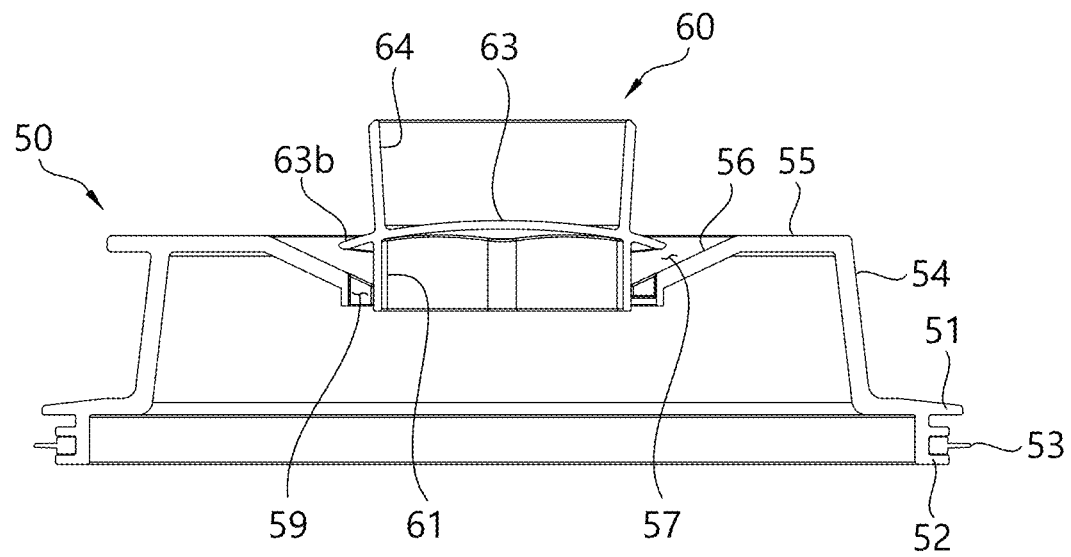
FIG. 6 is a cross-sectional view showing a state in which a lid and a lid cap of a food processor are coupled to each other according to one embodiment of the present disclosure.
Figure 7:
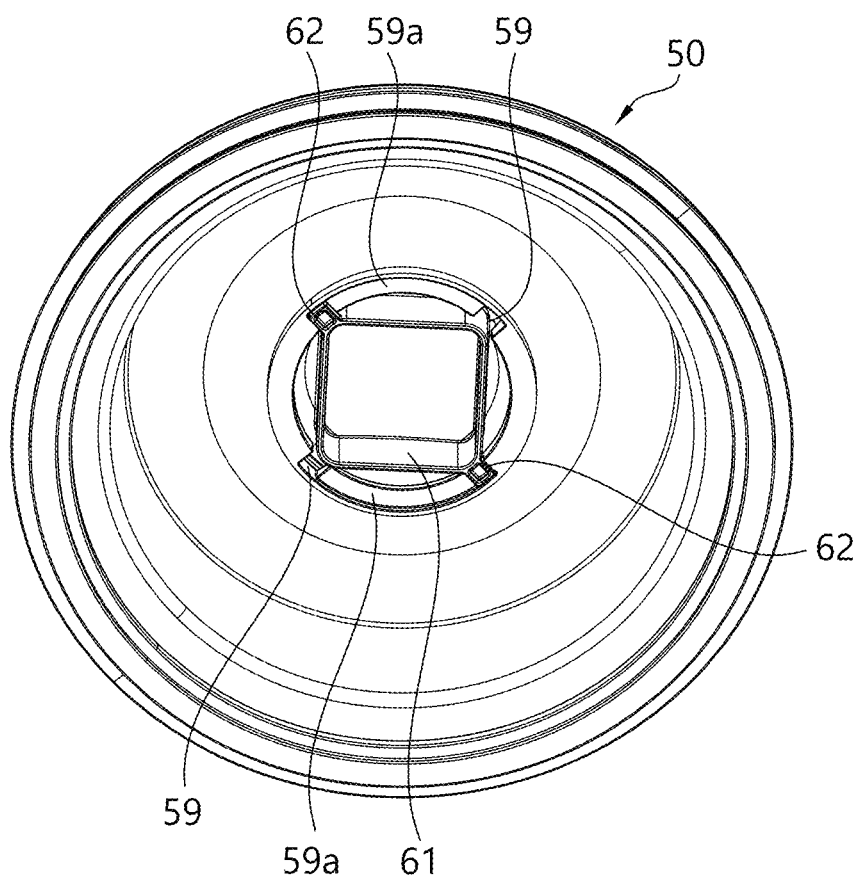
FIG. 7 is a perspective view illustrating a state in which a lid and a lid cap of a food processor are coupled to each other according to one embodiment of the present disclosure.
Figure 8:
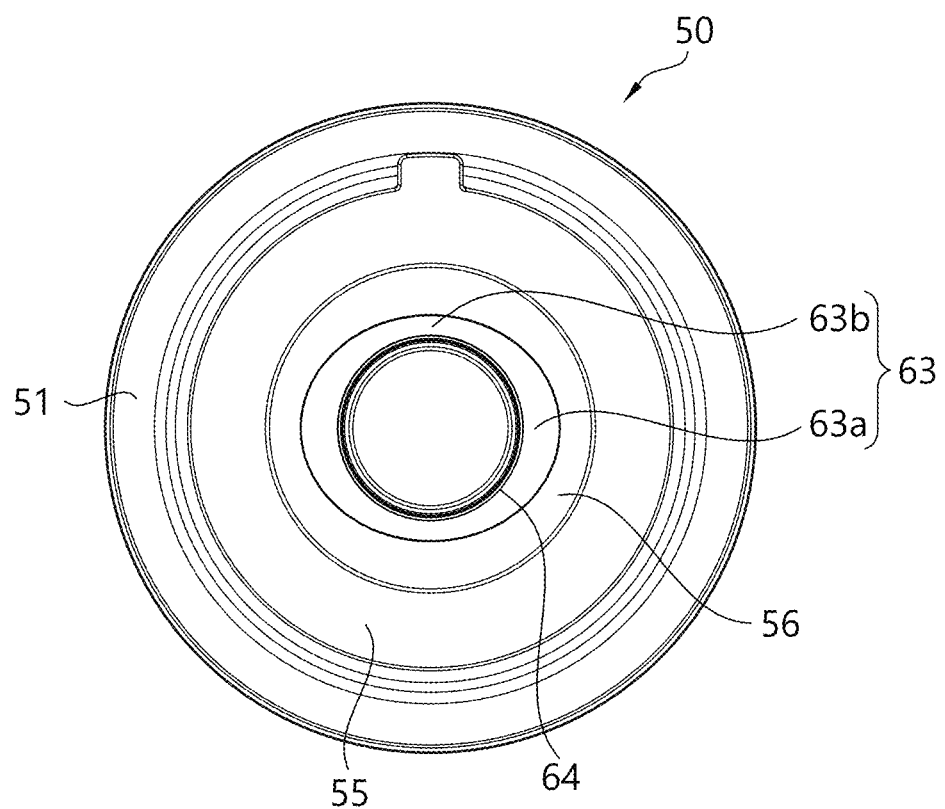
FIG. 8 is a plan view illustrating a state in which a lid and a lid cap of a food processor are coupled to each other according to one embodiment of the present disclosure.

FIG. 4 is a perspective view illustrating a lid cap of a food processor according to one embodiment of the present disclosure; FIG. 5 is a cross-sectional view of a lid cap of a food processor according to one embodiment of the present disclosure; FIG. 6 is a cross-sectional view showing a state in which a lid and a lid cap of a food processor are coupled to each other according to one embodiment of the present disclosure; FIG. 7 is a perspective view illustrating a state in which a lid and a lid cap of a food processor are coupled to each other according to one embodiment of the present disclosure; and FIG. 8 is a plan view illustrating a state in which a lid and a lid cap of a food processor are coupled to each other according to one embodiment of the present disclosure.

Referring to FIGS. 4 and 5, the lid cap 60 includes a stem 61, a stem protrusion 62, a steam blocking portion 63, and an extension stem 64.

The stem 61 extends downward from the steam blocking portion 63 and is inserted into the first steam discharge hole 58 of the lid 50. The stem 61 is installed to form a gap with the first steam discharge hole 58. This is to ensure that steam generated during a process of heating food ingredients by the heating unit 20 inside the accommodation tank 41 is discharged to the outside of the lid 50 through the gap between the stem 61 and the first steam discharge hole 58.

To this end, in this embodiment, the first steam discharge hole 58 is configured to have a circular shape, and the stem 61 is configured to have an approximately rectangular cross-section; however, if a gap can be formed between the first steam discharge hole 58 and the stem 61, the shapes of the first steam discharge hole 58 and the stem 61 may be modified in various ways.

The stem protrusion 62 may be formed to protrude on both sides of the stem 61. The stem protrusion 62 is configured to secure the lid cap 60 to the lid 50. A detailed description thereof will be provided later.

The steam blocking portion 63 covers an upper side of the stem 61 and is formed to extend laterally.

Referring to FIGS. 6 and 8, the steam blocking portion 63 is positioned above the first steam discharge hole 58, and may cover the entire top of the first steam discharge hole 58 so that the first steam discharge hole 58 is not visible when viewed from above due to the steam blocking portion 63. This is to ensure that steam discharged through the first steam discharge hole 58 is retained and condensed by the steam blocking portion 63. To enhance the steam retention effect, the steam blocking portion 63 may be formed with a curvature that slopes downward toward an edge. That is, the steam blocking portion 63 may have an umbrella shape that is convex upward overall.

Referring to FIG. 8, the steam blocking portion 63 may be formed to have different lengths in horizontal and vertical directions. For example, the steam blocking portion 63 may be formed in an oval shape, as shown in FIG. 8.

The steam blocking portion 63 may be composed of a first steam blocking portion 63a forming a major axis and a second steam blocking portion 63b forming a minor axis.

The first steam blocking portion 63a may be supported on an upper surface of the lid 50. The lid cap 60 may be secured to the lid 50 with the first steam blocking portion 63a supported on the upper surface of the lid 50 and the stem protrusion 62 supported on a lower surface of the lid 50. For secure fixation of the lid cap 60, the stem protrusion 62 may be configured to be positioned below the first steam blocking portion 63a.

Referring to FIG. 6, the second steam blocking portion 63b may be formed to be spaced apart from the upper surface of the lid 50. A steam discharge space 57 is formed between the upper surface of the lid 50 and the second steam blocking portion 63b.

Steam discharged through the first steam discharge hole 58 is retained at the bottom of the steam blocking portion 63, and some of the steam is condensed and liquefied while the non-liquefied steam is discharged through the steam discharge space 57.

Referring to FIG. 5, the extension stem 64 extends upward from the steam blocking portion 63.

The extension stem 64 may be used as a handle during a process of installing or separating the lid cap 60 on or from the lid 50. To increase grip strength, the extension stem 64 may be formed to have a shape that expands laterally upward. The extension stem 64 may be accommodated within the second steam discharge hole 94 of the upper cover 90.

Referring to FIGS. 3 and 6, the lid 50 may include a rim 51, an insertion portion 52, a sealing member 53, a side 54, an upper surface 55, an inclined portion 56, and the first steam discharge hole 58.

The rim 51 is formed to be seated at an upper end of an edge of the accommodation tank 41.

The insertion portion 52 is formed to extend downward from the rim 51. The insertion portion 52 is inserted into the accommodation tank 41 and comes into contact with or is in close contact with an inner wall of the accommodation tank 41.

The sealing member 53 is installed on the outside of the insertion part 52 and is in close contact with the inner wall of the accommodation tank 41. The sealing member 53 improves the sealing force between the lid 50 and the accommodation tank 41 and prevents liquid or steam from being discharged between the lid 50 and the accommodation tank 41.

The side 54 is formed to extend upward from the rim 51. The side 54 may extend to form an upwardly oblique slope. In other words, the side 54 may be formed in a shape in which a diameter decreases upward. This is to ensure that steam rising from the accommodation tank 41 is condensed and liquefied at the side 54 and then falls back into the accommodation tank 41. This may minimize moisture evaporation during processing of food ingredients.

The upper surface 55 is formed to extend inward from the side 54.

The inclined portion 56 forms a downward slope from the upper surface 55 and extends to the first steam discharge hole 58.

A space formed by the side 54, the upper surface 55, and the inclined portion 56 is positioned higher than the first steam discharge hole 58. Therefore, steam entering the space formed by the side 54, the upper surface 55, and the inclined portion 56 is retained in the space to be discharged through the first steam discharge hole 58, and a condensate that is liquefied during the retention process falls back into the accommodation tank 41, thereby minimizing moisture evaporation during processing of food ingredients.

Additionally, referring to FIG. 6, the space formed by the inclined portion 56 may form a space in which the lid cap 60 is accommodated. The first steam blocking portion 63a may be supported on the inclined portion 56, and the steam discharge space 57 may be formed between the inclined portion 56 and the second steam blocking portion 63b.

Referring to FIG. 7, the lid 50 includes a coupling groove 59 that is formed to be recessed from the first steam discharge hole 58. The coupling groove 59 is a space into which the stem protrusion 62 of the lid cap 60 is inserted.

A guide groove 59a extending from the coupling groove 59 to guide the stem protrusion 62 in a coupling direction may be formed in the lower surface of the lid 50.

The lid cap 60 is coupled to the lid 50 in such a way that when the lid cap 60 is rotated in the coupling direction with the stem protrusion 62 being inserted into the coupling groove 59, the stem protrusion 62 moves a predetermined distance along the guide groove 59a. The lid cap 60 may be coupled to the lid 50 by rotating approximately 90 degrees from a position where the stem protrusion 62 is inserted into the coupling groove 59.

Referring to FIG. 7, after the lid cap 60 is coupled to the lid 50, the coupling groove 59 becomes open. Therefore, a condensate condensed in the steam blocking portion 63 may fall down to the inclined portion 56 and then flow along the inclined portion 56 to the coupling groove 59 and enter into the accommodation tank 41.

Figure 9:
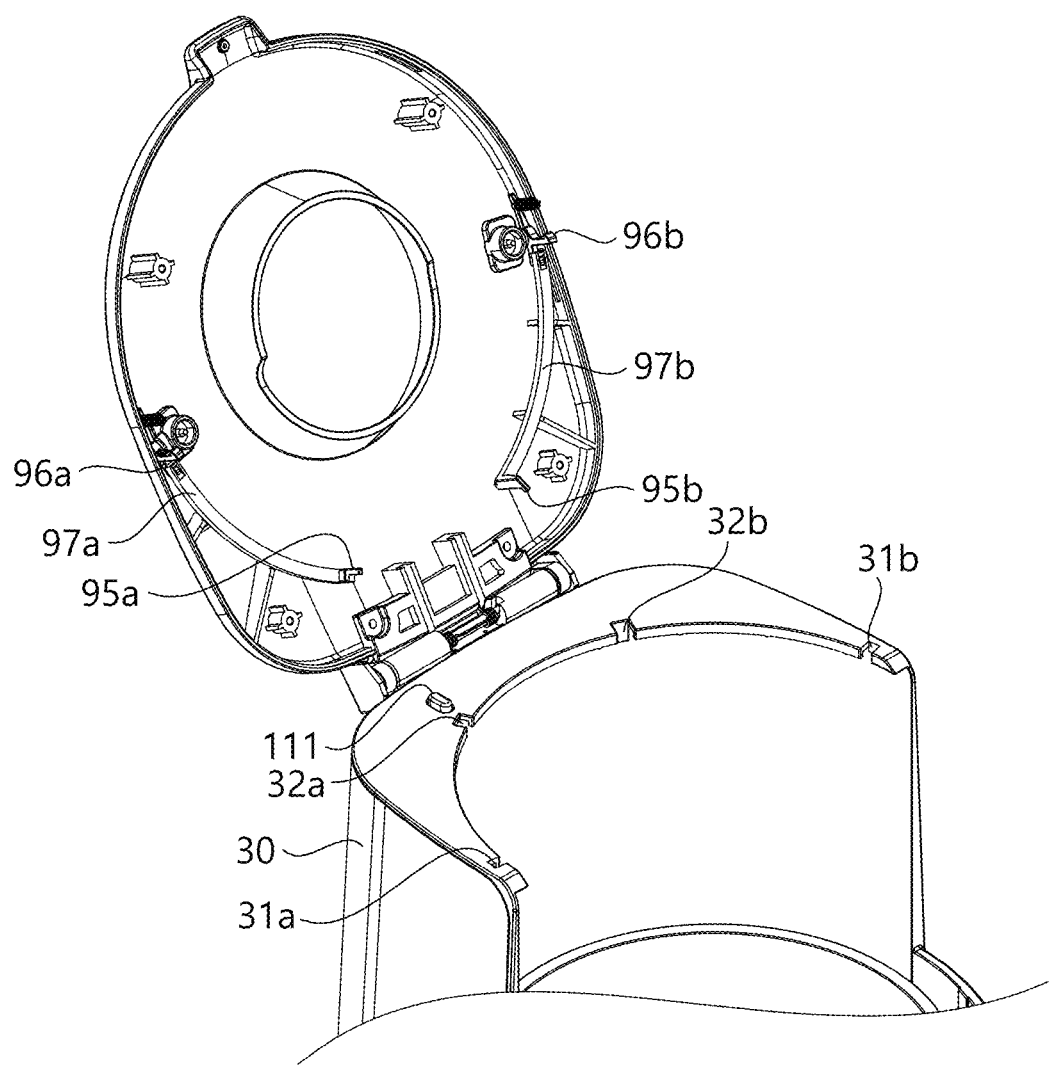
FIG. 9 is a perspective view illustrating an internal structure of an upper cover of a food processor according to one embodiment of the present disclosure.

FIG. 9 is a perspective view illustrating an internal structure of an upper cover of a food processor according to one embodiment of the present disclosure.

Referring to FIGS. 2 and 9, the upper cover 90 may include a first coupling hook 96b provided to be exposed downward on one side of the upper cover 90, and a second coupling hook 96a provided to be exposed downward on the other side of the upper cover 90. The first coupling hook 96b and the second coupling hook 96a may be exposed at the first lower surface 91 of the upper cover 90.

A first hook groove 31b, to which the first coupling hook 96b is coupled, and a second hook groove 31a, to which the second coupling hook 96a is coupled, may be formed in the upper surface of the cover accommodation part 30.

Each of the first coupling hook 96b and the second coupling hook 96a may be elastically supported by an elastic member such as a spring. The elastic member may provide an elastic force to move the first coupling hook 96b and the second coupling hook 96a to coupling positions where the first coupling hook 96b and the second coupling hook 96a are respectively coupled to the first hook groove 31b and the second hook groove 31a.

Referring to FIG. 2 and FIG. 9, the upper cover 90 may include a first unlock protrusion 95b to be exposed downward on one side of the upper cover 90, and a second unlock protrusion 95a to be exposed downward on the other side of the upper cover 90. The first unlock protrusion 95b and the second unlock protrusion 95a may be exposed at the first lower surface 91 of the upper cover 90.

A first unlock groove 32b, through which the first unlock protrusion 95b passes, and a second unlock groove 32a, through which the second unlock protrusion 95a passes, may be formed in the upper surface of the cover accommodation part 30. When the upper cover 90 is in the closed state, an end of the first unlock protrusion 95b may pass through the first unlock groove 32b to be positioned inside the cover accommodation part 30, and an end of the second unlock protrusion 95a may pass through the second unlock groove 32a to be positioned the cover accommodation part 30.

Referring to FIG. 9, a first connecting rod 97b connecting the first unlock protrusion 95b and the first coupling hook 96b is provided inside the upper cover 90, and a second connecting rod 97a connecting the second unlock protrusion 95a and the second coupling hook 96a is provided inside the upper cover 90.

Accordingly, the first coupling hook 96b and the first unlock protrusion 95b are interlocked and moved, and thus, the first coupling hook 96b may move from the coupling positions to release positions by moving the first unlock protrusion 95b. Similarly, the second coupling hook 96a and the second unlock protrusion 95a are interlocked and moved, and thus, the second coupling hook 96a may move from the coupling position to the release position by moving the second unlock protrusion 95a.

Figure 10:
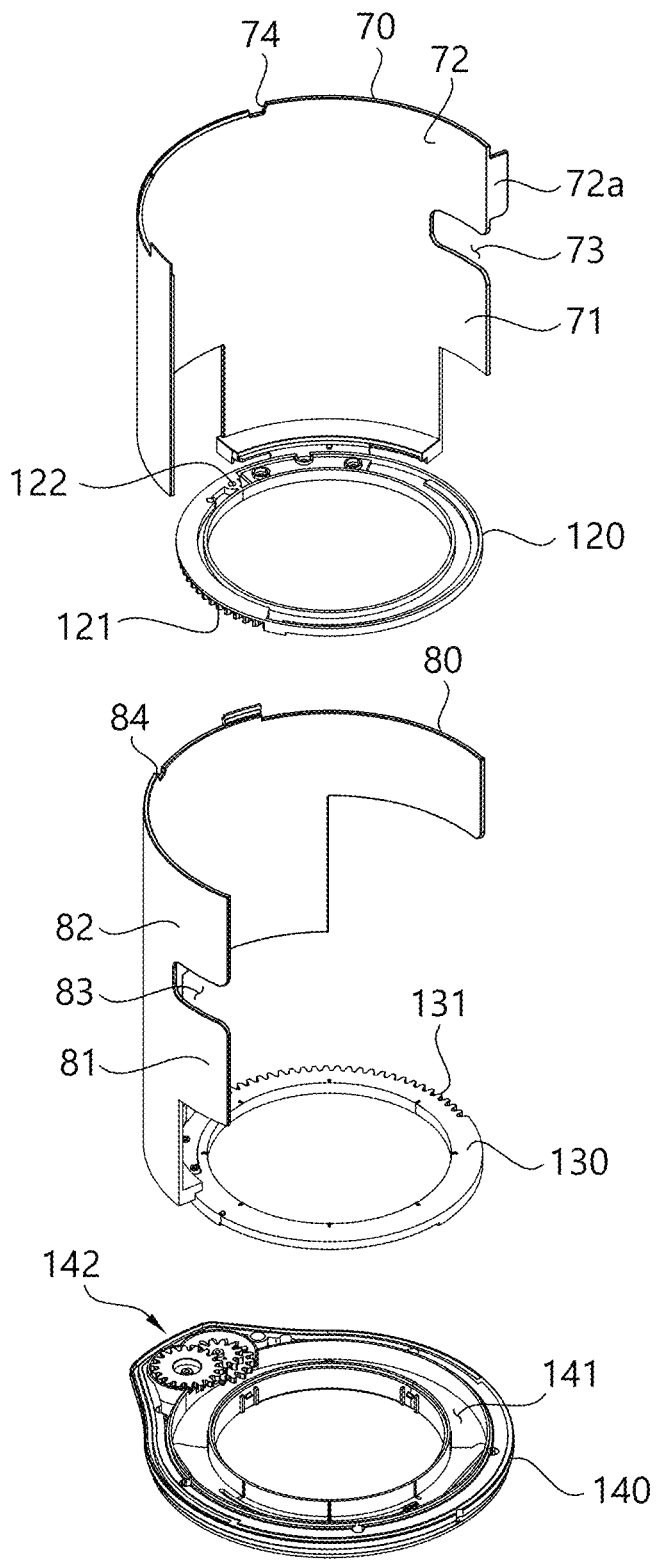
FIG. 10 is an exploded perspective view illustrating a first side cover, a second side cover, and a side cover driver of a food processor according to one embodiment of the present disclosure.
Figure 11:
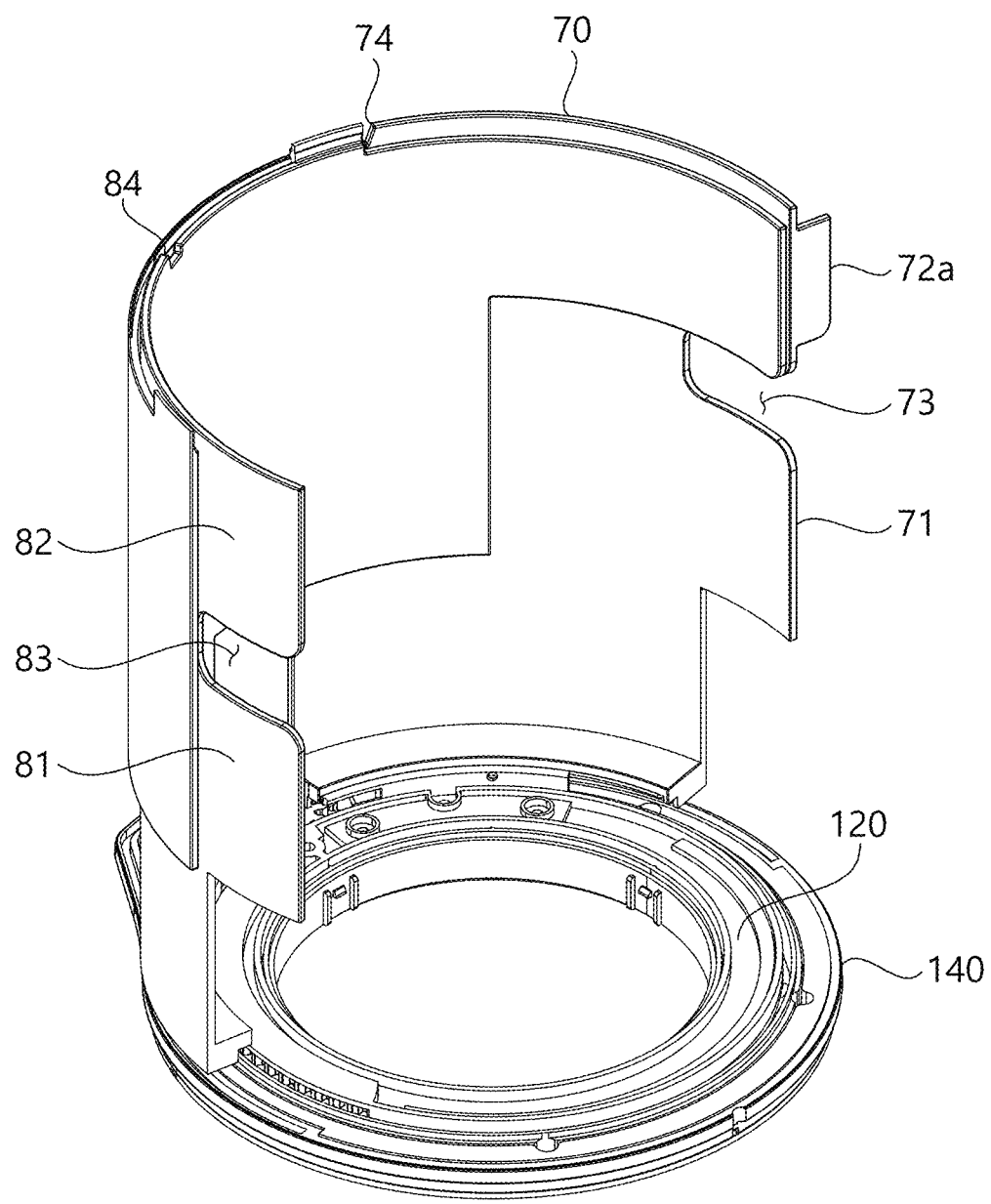
FIG. 11 is a perspective view showing an upper part of a food processor according to one embodiment of the present disclosure, in which a first side cover, a second side cover, and a side cover driver are assembled.
Figure 12:
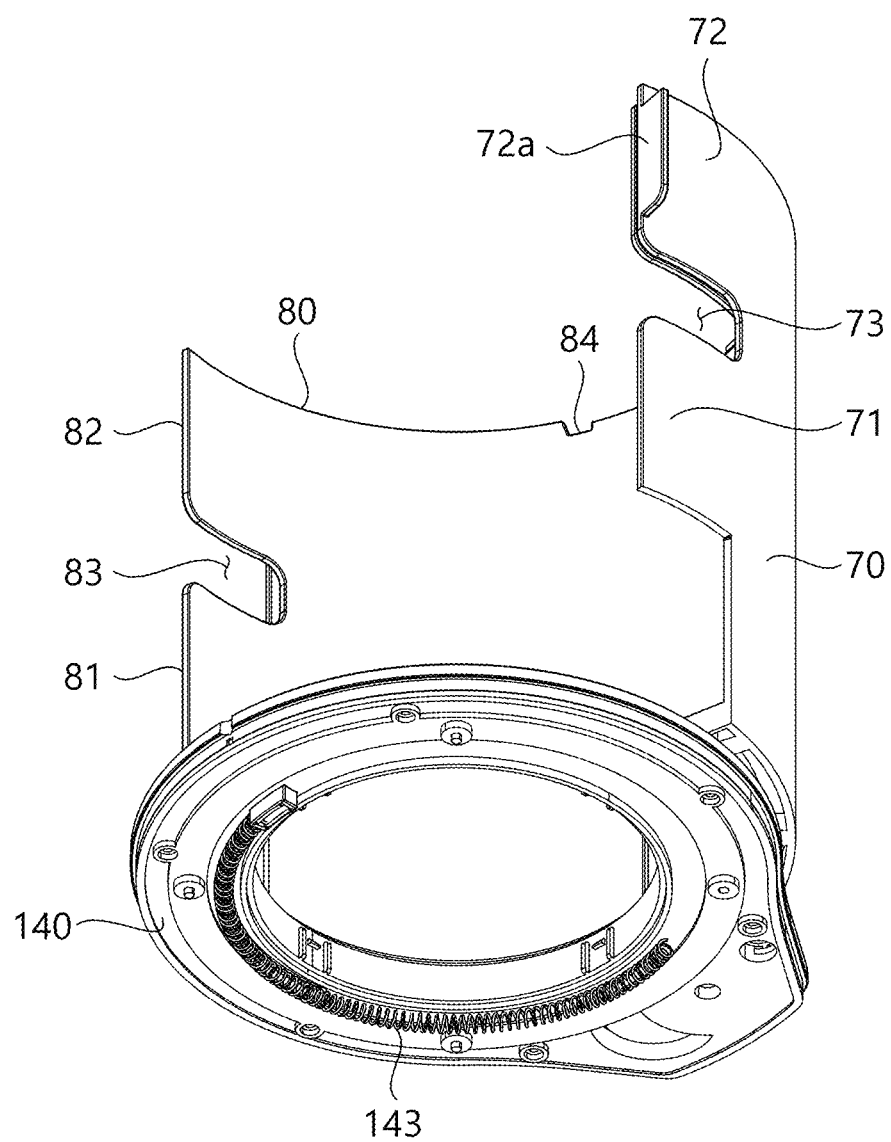
FIG. 12 is a perspective view showing a lower part of a food processor according to one embodiment of the present disclosure, in which a first side cover, a second side cover, and a side cover driver are assembled.

FIG. 10 is an exploded perspective view illustrating a first side cover, a second side cover, and a side cover driver of a food processor according to one embodiment of the present disclosure; FIG. 11 is a perspective view showing an upper part of a food processor according to one embodiment of the present disclosure, in which a first side cover, a second side cover, and a side cover driver are assembled; FIG. 12 is a perspective view showing a lower part of a food processor according to one embodiment of the present disclosure, in which a first side cover, a second side cover, and a side cover driver are assembled; and FIG. 13 is a perspective view illustrating a state in which an upper cover is removed in a closed state of a food processor according to one embodiment of the present disclosure.

Referring to FIGS. 10 to 12, the first side cover 70 may be formed in the shape of an arc of approximately 180 degrees. A first lower flap 71 and a first upper flap 72 are arranged vertically on one side of the first side cover 70, and a first slit 73 formed to be recessed from one side is formed between the first lower flap 71 and the first upper flap 72.

Figure 13:
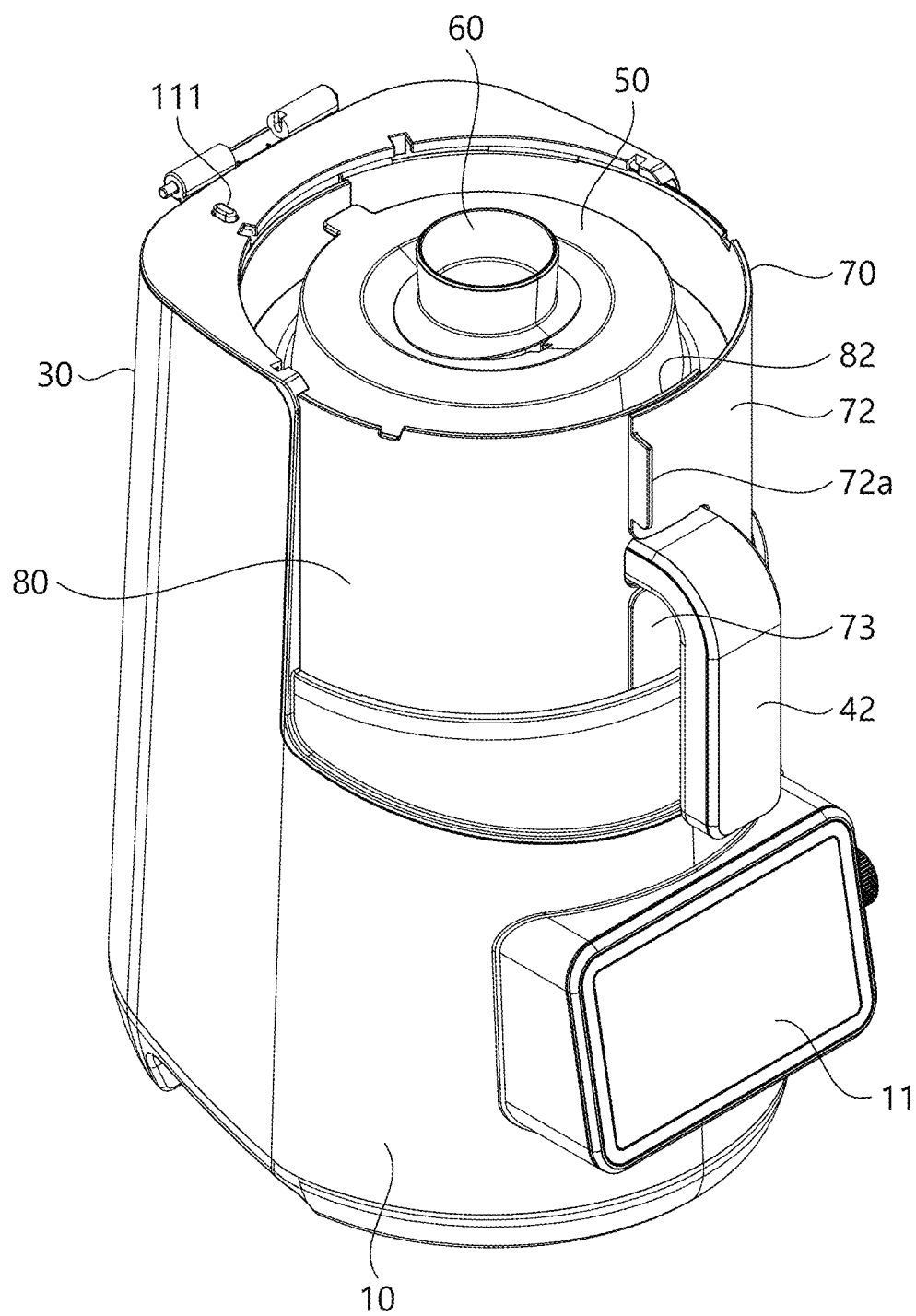
FIG. 13 is a perspective view illustrating a state in which an upper cover is removed in a closed state of a food processor according to one embodiment of the present disclosure.

Referring to FIG. 13, when the first side cover 70 is in the closed state, the first lower flap 71 is positioned between the handle 42 and the accommodation tank 41, the first upper flap 72 is positioned above the handle 42, and the first slit 73 accommodates the handle 42 to allow the handle 42 to pass through.

A first unlock tab 74 is formed at an upper end of the first side cover 70 to have a step.

When the first side cover 70 moves from the closed state to the open state, the first unlock tab 74 enters into the cover accommodation part 30 to push the first unlock protrusion 95b (see FIG. 9) positioned inside the cover accommodation part 30. As the first unlock protrusion 95b moves from the coupling position to the release position due to the first unlock tab 74, the first coupling hook 96b also moves from the coupling position to the release position, thereby allowing the upper cover 90 to switch to the open state.

The first upper flap 72 may include a protruding tip 72a formed to extend forward. The protruding tip 72a allows a user to easily move the first side cover 70 from the closed state to the open state. The user is able to move the first side cover 70 from the closed state to the open state by pushing the protruding tip 72a formed perpendicular to the rotational shaft of the first side cover 70.

Referring to FIGS. 10 to 12, the second side cover 80 may be formed in the shape of an arc of approximately 180 degrees. A second lower flap 81 and a second upper flap 82 are arranged vertically on the other side of the second side cover 80, and a second slit 83 formed to be recessed from one side is formed between the second lower flap 81 and the second upper flap 82.

Referring to FIG. 13, when the second side cover 80 is in the closed state, the second upper flap 82 is positioned above the handle 42. Also, although not shown, the second lower flap 81 is positioned between the handle 42 and the accommodation tank 41, and the second slit 83 accommodates the handle 42 to allow the handle 42 to passes through.

When the first side cover 70 and the second side cover 80 are in the closed state, the first lower flap 71 and the second lower flap 81 overlap toward the front and the first upper flap 72 and the second upper flap 82 overlap toward the front. The first upper flap 72 having the protruding tip 72a formed therein may be positioned further forward than the second upper flap 82.

The first upper flap 72 and the second upper flap 82 may be accommodated in the flap accommodation groove 93, which is formed in the second lower surface of the upper cover 90, in an overlapped state.

In the closed state, the first side cover 70 and the second side cover 80 overlap each other with the handle 42 at the center, so that the noise isolation effect is increased and the heat insulation effect is increased by minimizing the leakage of heat provided from the heating unit 20.

In addition, since the handle 42 is accommodated in the first slit 73 of the first side cover 70 and the second slit 83 of the second side cover 80 in the closed state, the upper, lower, left, and right sides of the handle 42 may be all supported by the first side cover 70 and the second side cover 80 and vibration of the container 40 may be suppressed more effectively.

A second unlock tab 84 is formed at an upper end of the second side cover 80 to have a step.

When the second side cover 80 moves from the closed state to the open state, the second unlock tab 84 enters into the cover accommodation part 30 to push the second unlock protrusion 95a (see FIG. 9) positioned inside the cover accommodation part 30. As the second unlock protrusion 95a moves from the coupling position to the release position due to the second unlock tab 84, the second coupling hook 96a also moves from the coupling position to the release position, thereby allowing the upper cover 90 to switch to the open state.

When both the first side cover 70 and the second side cover 80 move from the closed state to the open state, the coupling between the upper cover 90 and the cover accommodation part 30 is released due to the interaction of the first unlock tab 74, the first unlock protrusion 95b, and the first coupling hook 96b and the interaction of the second unlock tab 84, the second unlock protrusion 95a, and the second coupling hook 96a. Afterwards, the upper cover 90 automatically switches to the open state by an elastic force.

That is, as the first side cover 70 and the second side cover 80 move from the closed state to the open state, the upper cover 90 automatically switches from the closed state to the open state.

Referring to FIGS. 10 to 12, the first side cover 70 is coupled to a first moving part 120, and the second side cover 80 is coupled to the second moving part 130. The first moving part 120 and the second moving part 130 are movably connected to an interlocking part 140.

The first moving part 120 may be configured in a ring shape, and the first side cover 70 is fixed to one side of the first moving part 120 and is able to switch between a closed state and an open state by the rotation of the first moving part 120.

A fixing groove 122 into which a fixing pin 114 (see FIG. 14) to be described is inserted may be formed on one side of the first moving part 120. A first gear 121 that meshes with an interlocking gear part 142 may be formed in a side surface of the first moving part 120.

The second moving part 130 may also be configured in a ring shape, and the second side cover 80 is fixed to the other side of the second moving part 130 and is able to switch between the closed state and the open state by the rotation of the second moving part 130.

A second gear 131 that meshes with the interlocking gear part 142 may be formed in a side surface of the second moving part 130.

The interlocking part 140 may have a circular guide receiving groove 141 formed in an upper surface thereof to accommodate the first moving part 120 and the second moving part 130 and to guide the movement of the first moving part 120 and the second moving part 130. The interlocking part 140 may include the interlocking gear part 142 installed adjacent to the guide receiving groove 141.

The interlocking gear part 142 allows the movement of the first side cover 70 and the second side cover 80 to be interlocked. The interlocking gear part 142 may have a gear structure such that the second side cover 80 moves from the closed state to the open state when the first side cover 70 moves from the closed state to the open state, while the second side cover 80 moves from the open state to the closed state when the first side cover 70 moves from the open state to the closed state. That is, the interlocking gear part 142 may cause one of the first side cover 70 and the second side cover 80 to be rotated in one direction when the other one is rotated in the opposite direction.

Accordingly, by simply moving only the first side cover 70 from the closed state to the open state, the second side cover 80 moves from the closed state to the open state, and as the first side cover 70 and the second side cover 80 move from the closed state to the open state, the upper cover 90 is automatically moved from the closed state to the open state as described above. That is, simply by a user moving only the first side cover 70 from the closed state to the open state, the second side cover 80 and the upper cover 90 also switch from the closed state to the open state, thereby greatly improving user convenience.

Referring to FIG. 11, the first moving part 120 and the second moving part 130 may be installed in a stacked manner within the guide receiving groove 141. For example, the second moving part 130 may be positioned below the first moving part 120.

Referring to FIG. 11, the first side cover 70 may be provided outside the second side cover 80, and a movement path of the first side cover 70 and a movement path of the second side cover 80 may be configured not to intersect each other so as to prevent mutual interference between the first side cover 70 and the second side cover 80.

Referring to FIG. 12, the interlocking part 140 may include an elastic member 143 that stores an elastic force when the first side cover 70 and the second side cover 80 are in the open state. That is, the elastic member 143 may provide the elastic force to allow the first side cover 70 and the second side cover 80 to move from the open state to the closed state. The elastic member 143 may be a spring that contracts when the first moving part 120 moves from the closed state to the open state.

Figure 14:
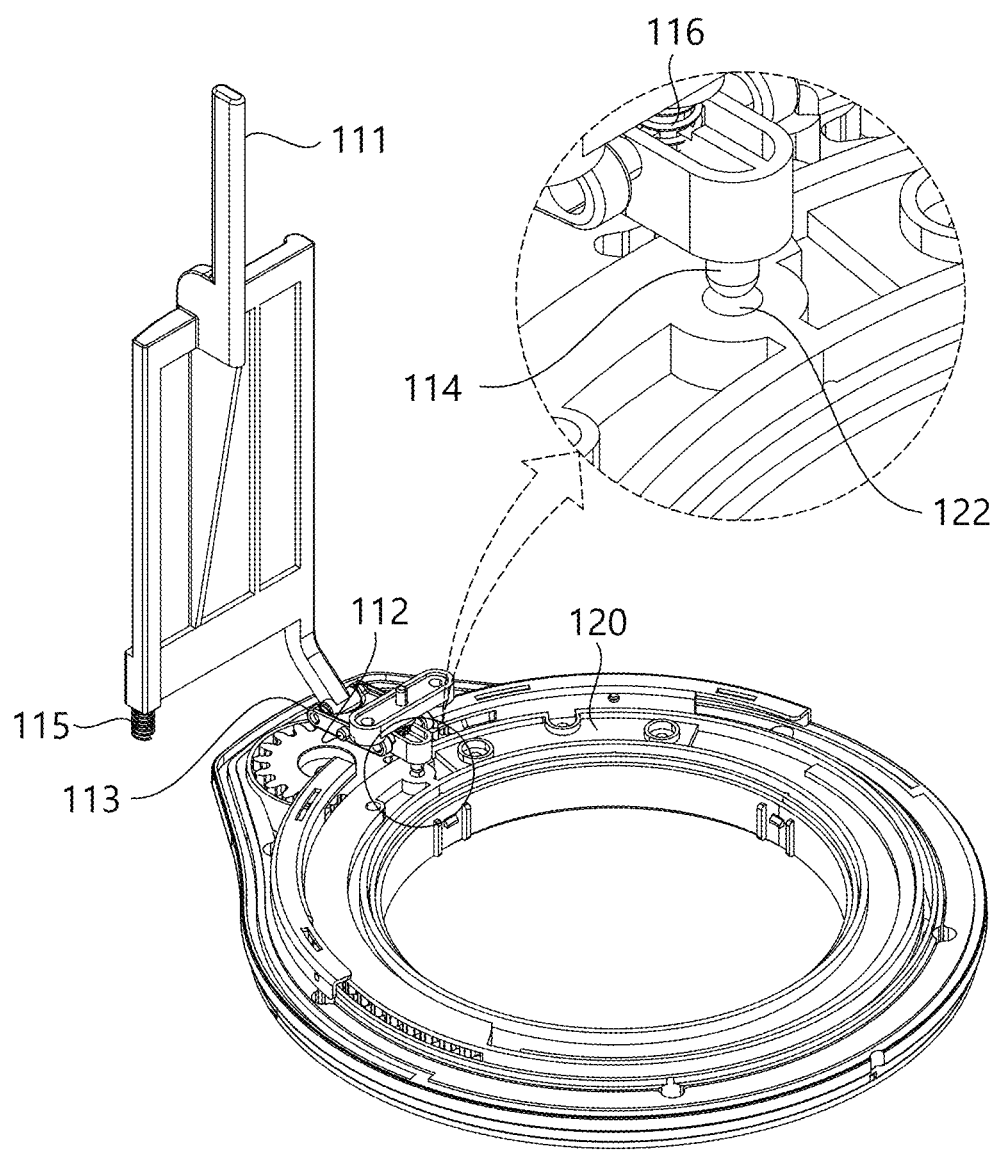
FIG. 14 is a perspective view illustrating an upper cover interlocking part and the like of a food processor according to one embodiment of the present disclosure.

FIG. 14 is a perspective view illustrating an upper cover interlocking portion and the like of a food processor according to one embodiment of the present disclosure.

Referring to FIG. 14, an opening and closing sensing part 111 and the fixing pin 114, which operate in conjunction with the opening and closing of the upper cover 90, are provided inside the cover accommodation part 30.

An end of the opening and closing sensing part 111 is exposed at the upper surface of the cover accommodation part 30 (see FIG. 13). The opening and closing sensing part 111 is lowered by the first lower surface 91 when the upper cover 90 is in the closed state, and the opening and closing sensing part 111 is raised by the elastic force of an elastic member 115 when the upper cover 90 is in the open state.

In conjunction with the lifting and lowering operation of the opening and closing sensing part 111, the fixing pin 114 is lowered and inserted into the fixing groove 122 when the upper cover 90 is in the open state, and is raised and released from the fixing groove 122 when the upper cover 90 is in the closed state.

As an example, the opening and closing sensing part 111 and the fixed pin 114 may be interlocked as described above, while being connected to both sides of a link 113 performing a seesaw motion about a rotational shaft 112.

The fixed pin 114 may be provided with an elastic force in a downward direction by an elastic member 116.

Figure 15:
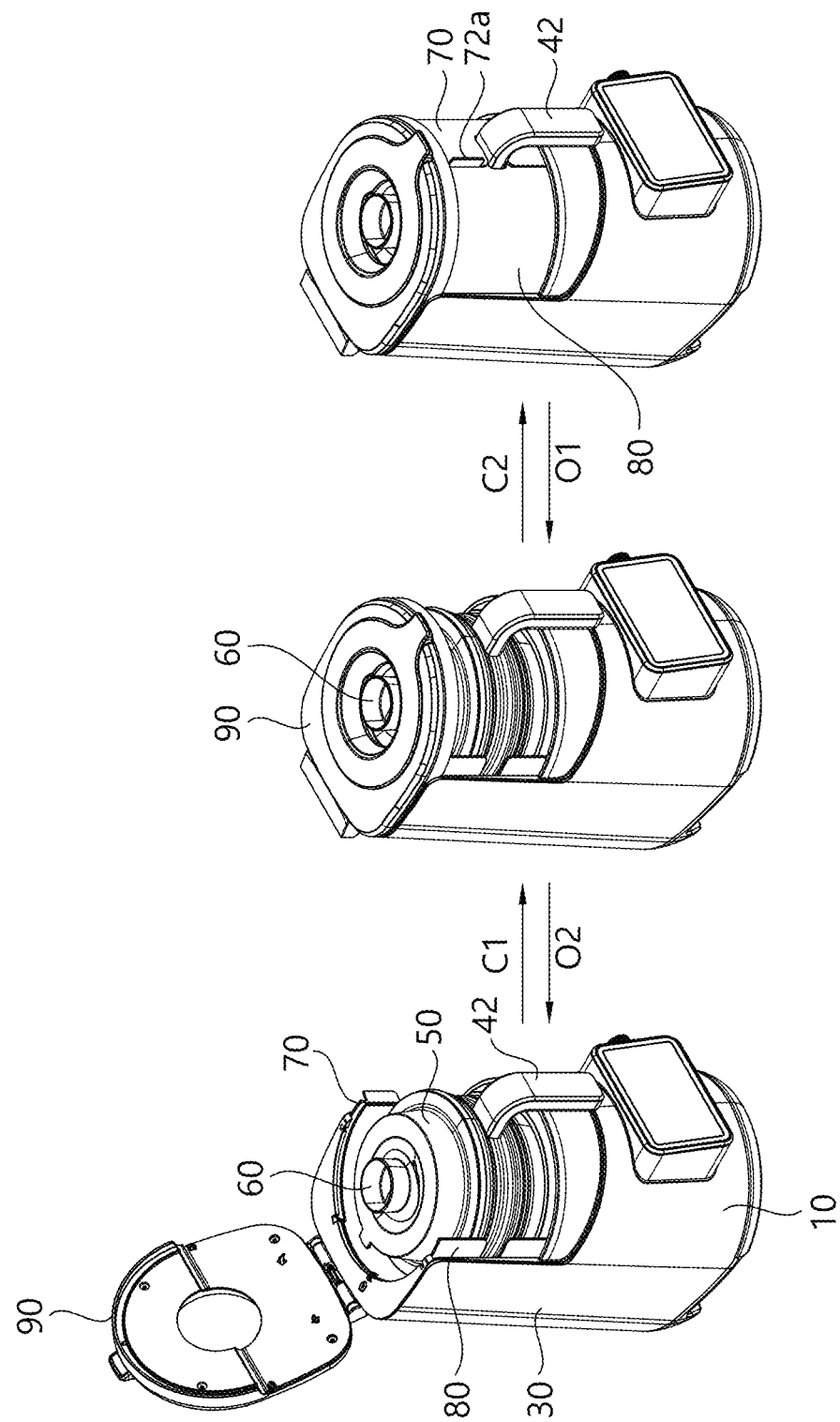
FIG. 15 is a view for explaining a switching operation between the open state and the closed state of a food processor according to one embodiment of the present disclosure.

FIG. 15 is a view for explaining a switching operation between the open state and the closed state of a food processor according to one embodiment of the present disclosure.

When the first side cover 70, the second side cover 80, and the upper cover 90 are in the open state, the fixing pin 114 is inserted into the fixing groove 122 to prevent the first moving part 120 from moving to the closed state due to the elastic force of the elastic member 143 (see FIG. 12). Since the movement of the first moving part 120 is restricted, the second moving part 130 also remains open. Accordingly, as long as the upper cover 90 remains open, the first side cover 70 and the second side cover 80 also remain open.

When the user switches the upper cover 90 from the open state to the closed state (C1), the opening and closing sensing part 111 is lowered and the fixing pin 114 is raised and released from the fixing groove 122. As the first moving part 120 and the second moving part 130 are moved to the closed state due to the elastic force of the elastic member 143 (see FIG. 12), the first side cover 70 and the second side cover 80 switch from the open state to the closed state (C2).

That is, simply by the user switching the upper cover 90 from the open state to the closed state, the first side cover 70 and the second side cover 80 automatically switch from the open state to the closed state.

In a state where the first side cover 70, the second side cover 80, and the upper cover 90 are in the closed state, if the user moves the first side cover 70 from the closed state to the open state using the protruding tip 72*a*, the second side cover 80 moves from the closed state to the open state in conjunction with the first side cover 70 (O1).

When both the first side cover 70 and the second side cover 80 move from the closed state to the open state, the coupling between the upper cover 90 and the cover accommodation part 30 is released due to the interaction of the first unlock tab 74, the first unlock protrusion 95*b*, and the first coupling hook 96*b* and the interaction of the second unlock tab 84, the second unlock protrusion 95*a*, and the second coupling hook 96*a*. Afterwards, the upper cover 90 automatically switches to the open state due to an elastic force (O2).

That is, simply by the user switching the first side cover 70 from the closed state to the open state, the upper cover 90 and the second side cover 80 automatically switch from the closed state to the open state.

The exemplary embodiments of the present disclosure have been described with reference to the accompanying drawings, but those skilled in the art will understand that the present disclosure may be implemented in other specific forms without changing the technical spirit or essential features thereof. Therefore, the exemplary embodiments should be considered in a descriptive sense only and not for purposes of limitation. Accordingly, the scope of the present disclosure is defined by the appended claims rather than the foregoing description and the exemplary embodiments described therein. Various modifications made within the meaning of an equivalent of the claims of the present invention and within the claims are to be regarded to be in the scope of the present disclosure.

What is claimed is:

1. A food processor comprising:
a container comprising an accommodation tank with an upward opening and a handle formed to protrude from the accommodation tank;
a lid coupled to the accommodation tank to cover an upper side of the accommodation tank, and having a first steam discharge hole formed in a central portion of the lid;
a lid cap coupled to the lid to cover the first steam discharge hole;
a base in which the container is placed so that the handle is positioned at a front;
a heating unit provided in the base to surround a lower part of the accommodation tank and heat food ingredients in the accommodation tank;
a cover accommodation part formed to extend upward from the base so as to be positioned at a rear of the accommodation tank;
a first side cover provided to be retractable from one side of the cover accommodation part to open or close one side of the accommodation tank;
a second side cover provided to be retractable from the other side of the cover accommodation part to open or close the other side of the accommodation tank; and
an upper cover rotatably provided on top of the cover accommodation part to accommodate the accommodation tank, the lid, and the lid cap, and to open and close an upper side of the accommodation space surrounded by the cover accommodation part, the first side cover, and the second side cover,
wherein the lid cap comprises a stem passing through the first steam discharge hole, a stem protrusion formed on both sides of the stem and secured to the lid, an oval-shaped steam blocking portion covering an upper side of the stem and extending laterally to cover the upper side of the first steam discharge hole,
wherein the lid comprises a coupling groove formed to be recessed from the first steam discharge hole and into which the stem protrusion is inserted, and a guide groove extending from the coupling groove to a lower surface of the lid and guiding the stem protrusion in a coupling direction,
wherein the steam blocking portion comprises a first steam blocking portion forming a major axis of the steam blocking portion and supported on an upper surface of the lid, and a second steam blocking portion forming a minor axis of the steam blocking portion and positioned above the coupling groove to be spaced apart from the upper surface of the lid to form a steam discharge space,
wherein a part of steam discharged between the stem and the first steam discharge hole is discharged through the steam discharge space, and the other part is condensed and liquefied by the first steam blocking portion and the second steam blocking portion and then flows into the accommodation tank through the coupling groove,
wherein the first side cover comprises a first lower flap, a first upper flap, and a first slit, wherein in a state where the first side cover closes one side of the accommodation tank, the first lower flap is positioned between the handle and the accommodation tank, the first upper flap is positioned above the handle, and the first slit is provided between the first upper flap and the first lower flap to allow the handle to pass through,
wherein the second side cover comprises a second lower flap, a second upper flap, and a second slit, wherein in a state where the second side cover closes the other side of the accommodation tank, the second lower flap is positioned between the handle and the accommodation tank, the second upper flap is positioned above the handle, and the second slit is provided between the second upper flap and the second lower flap to allow the handle to pass through,
wherein in a state where the first side cover closes one side of the accommodation tank and the second side cover closes the other side of the accommodation tank, the first lower flap and the second lower flap overlap each other toward the front, and the first upper flap and the second upper flap overlap toward the front,
wherein a lower surface of the upper cover comprises a first lower surface in contact with an upper surface of the cover accommodation part, and a second lower surface in contact with the first side cover and the second side cover,
wherein the second lower surface forms a step with the first lower surface, and a flap receiving groove is formed in the second lower surface to receive the first upper flap and the second upper flap,
wherein the first side cover is moved to close one side of the accommodation tank in conjunction with movement of the second side cover closing the other side of the accommodation tank,
wherein the first side cover is moved to open one side of the accommodation tank in conjunction with movement of the second side cover opening the other side of the accommodation tank,
wherein in a state where the first side cover closes one side of the accommodation tank and the second side cover closes the other side of the accommodation tank, at least one of the first side cover and the second side cover is elastically supported, and in conjunction with the operation of the upper cover opening the accommodation space, the first side cover and the second side cover are moved due to an elastic force to close one side and the other side of the accommodation tank, and
wherein the upper cover is elastically supported in a state where the upper cover closes the accommodation space, and the upper cover is moved due to an elastic force to open the accommodation space in conjunction with the first side cover opening one side of the accommodation tank and the second side cover opening the other side of the accommodation tank.

2. The food processor of claim 1, wherein the upper cover has a second steam discharge hole formed in an upper side of the lid cap through which steam is discharged.

3. The food processor of claim 2, wherein the second steam discharge hole passes through the first lower surface and the second lower surface.

4. The food processor of claim 2, wherein the lid cap further comprises an extension stem extending upward from the steam blocking portion and accommodated within the second steam discharge hole.

5. The food processor of claim 1,
- wherein in a state where the first side cover closes one side of the accommodation tank and the second side cover closes the other side of the accommodation tank, the first upper flap is positioned further forward than the second upper flap, and the first upper flap further comprises a protruding tip extending forward.

\* \* \* \* \*